United States Patent [19]

Sullivan et al.

[11] Patent Number: 5,563,420
[45] Date of Patent: Oct. 8, 1996

[54] INTEGRATED ULTRAVIOLET AND INFRARED SOURCE WITH MINIMAL VISIBLE RADIATION

[75] Inventors: M. E. Sullivan, Santa Barbara; G. A. Walter, Santa Ynez; D. A. Thiede, Santa Barbara, all of Calif.

[73] Assignee: Santa Barbara Research Center, Goleta, Calif.

[21] Appl. No.: 330,482

[22] Filed: Oct. 28, 1994

[51] Int. Cl.⁶ .................................................. G01J 1/00
[52] U.S. Cl. ................................ 250/504 R; 250/495.1; 250/493.1
[58] Field of Search ..................... 250/495.1, 504 R, 250/338.5, 493.1; 364/496

[56] References Cited

U.S. PATENT DOCUMENTS

| | | | |
|---|---|---|---|
| 3,229,095 | 1/1966 | Lasher et al. | 250/495 |
| 3,947,688 | 3/1976 | Massey | 250/495 |
| 4,798,464 | 1/1989 | Boostrom | 356/328 |
| 5,055,685 | 10/1991 | Sugimoto et al. | 250/342 |
| 5,055,697 | 10/1991 | Manoogian et al. | 250/504 R |
| 5,210,702 | 5/1993 | Bishop | 364/496 |
| 5,217,285 | 6/1993 | Sopori | 362/1 |
| 5,319,199 | 6/1994 | Stedman et al. | 250/338.5 |

*Primary Examiner*—Bruce C. Anderson
*Attorney, Agent, or Firm*—W. C. Schubert; W. K. Denson-Low

[57] ABSTRACT

A single integrated source of infrared and ultraviolet energy with minimal visible radiation therein. The invention (10) includes a first source of infrared and visible radiation (12) and a second source of ultraviolet and visible radiation (14). In a specific implementation, visible radiation from the infrared source (12) is eliminated by a filter (20) comprising a germanium substrate coated with a thin film multilayer stack. The filtered infrared beam and the ultraviolet beam are combined by a set of mirrors. A cold first mirror (30) directs the ultraviolet energy to a cold second mirror (22) which then transmits infrared energy and reflects ultraviolet energy. The visible radiation from the ultraviolet source is eliminated by transmission through the first cold mirror. The first and second mirrors provide a composite output beam which is collimated by a third mirror (36) and output as a single beam. For safety, a shutter (24) is provided in front of the ultraviolet source (14). The shutter (24) is triggered by a suitably positioned vehicle sensor (26). In addition, a chopper (35) is provided facilitate detection of the output beam. Thus, a beam of both ultraviolet and infrared energy is directed to a single section of an exhaust plume. This enables optimal detection of atmospheric pollutants by a single compact integrated UV and IR sensor head with minimal calibration and signal processing requirements.

1 Claim, 1 Drawing Sheet

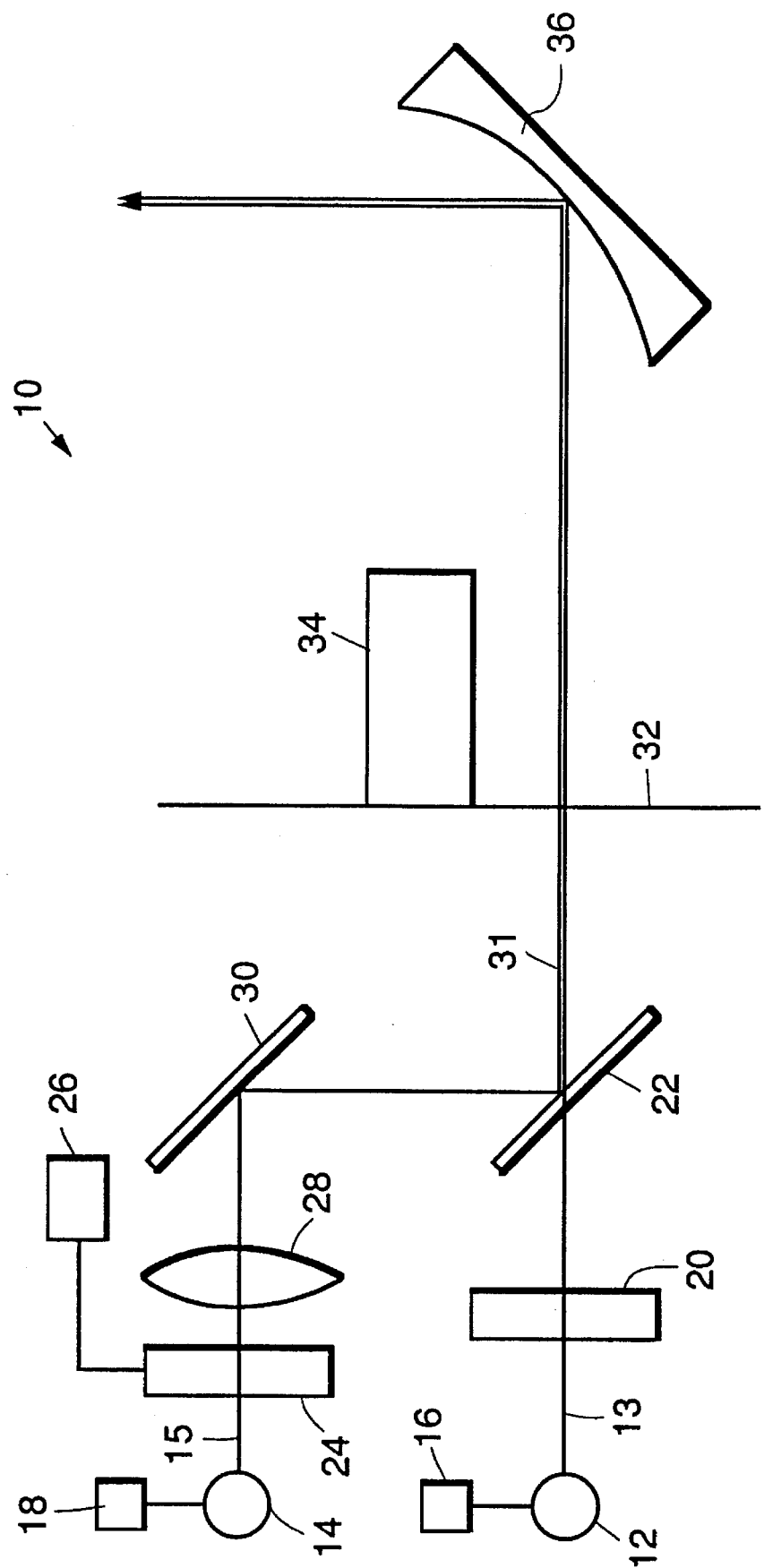

INTEGRATED ULTRAVIOLET AND INFRARED SOURCE WITH MINIMAL VISIBLE RADIATION

BACKGROUND OF THE INVENTION

1. Field of the Invention

The present invention relates to systems and techniques for sensing atmospheric pollutants. More specifically, the present invention relates to sources for use in systems for remotely sensing atmospheric pollutants.

2. Description of the Related Art

Automobile exhaust contributes significantly to atmospheric pollution. Accordingly, efforts to abate adverse environmental impact due to automobile exhaust require an understanding of the nature of the pollutants therein. Accordingly, systems have been developed to measure pollutants in automobile exhaust.

The most accurate readings are acquired when the vehicle is in operation. This requires that the exhaust be measured remotely. Conventional remote sensing systems utilize optical sensors positioned along a roadside. The sensors measure absorption in the exhaust of optical energy at different wavelengths. The energy is typically provided from a first source of ultraviolet radiation (UV) and a separate second source of infrared (IR) radiation. Unfortunately, these dual source systems do not provide a simultaneous UV and IR measurement capability. That is, each sensor sees a different portion of the exhaust plume. Hence, these systems can not generally correlate data to a single section of the exhaust plume.

The use of dual sources is also problematic in that two sensor heads are required. This presents calibration problems, requires considerable signal processing and is not as compact as a single sensor arrangement.

Thus, a need existed in the art for a system and technique for providing a single source of infrared and ultraviolet radiation for use with systems for remotely sensing atmospheric pollutants in automobile exhaust.

This need was addressed by U.S. Pat. No. 5,210,702, entitled APPARATUS FOR REMOTE ANALYSIS OF VEHICLE EMISSIONS, issued May 11, 1993 to Bishop et al., the teachings of which are incorporated herein by reference. This system purports to use a single source of UV and IR radiation to analyze exhaust plumes. However, no means is provided for suppressing the visible radiation so that it is not sensed by the ultraviolet detector.

Thus, a need remains in the art for a system and technique for providing a single source of infrared and ultraviolet radiation for use with systems for remotely sensing atmospheric pollutants in automobile exhaust with a UV detector which is protected from visible radiation.

SUMMARY OF THE INVENTION

The need in the art is addressed by the present invention which provides a single integrated source of infrared and ultraviolet energy with minimal visible radiation therein. The invention includes a first source of infrared and visible radiation and a second source of ultraviolet radiation. In a specific implementation, visible radiation from the infrared source is eliminated by a filter comprising a germanium substrate coated with a thin film multilayer stack.

The filtered infrared beam and the ultraviolet beam are combined by a set of mirrors. A first mirror directs the ultraviolet energy to a second mirror which then transmits infrared energy and reflects ultraviolet energy. The first and second mirrors provide a composite output beam which is collimated by a third mirror and output as a single beam. For safety, a shutter is provided in front of the ultraviolet source. The shutter is triggered by a suitably positioned vehicle sensor. In addition, a chopper is provided to facilitate detection of the output beam. Thus, a beam of both ultraviolet and infrared energy is directed to a single section of an exhaust plume. This enables optimal detection of atmospheric pollutants by a single compact integrated UV and IR sensor head with minimal calibration and signal processing requirements.

BRIEF DESCRIPTION OF THE DRAWINGS

The FIGURE is a block diagram of the integrated ultraviolet and infrared source of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The FIGURE is a block diagram of the integrated ultraviolet and infrared source of the present invention. The integrated source 10 includes an infrared source 12 and an ultraviolet source 14. The infrared source 12 may be a conventional carbide resistive radiation source of visible and infrared energy. The infrared source provides an output beam 13 of radiation when powered by a power supply 16. The beam 13 is filtered by a long wavelength filter coating on the element 20. The element 20 may be a window or lens constructed of germanium or other suitable material, and is removable so that visual alignment of the source with the sensor can be accomplished. The element is coated with an optical thin film in a conventional manner, i.e., to transmit greater than 90% of the radiation between 2 and 6 micrometers and to reflect or absorb greater than 99.9% of radiation at wavelengths short enough to be detected by the ultraviolet channel, shorter than 1.2 micrometers in most applications. Thus, the effect of the coated element 20 is to eliminate from the beam 13 radiation that would be sensed by the ultraviolet detector, and would lead to an erroneous signal, while maintaining high throughput of the infrared signal. The filtered infrared radiation is passed to a first mirror 22.

The ultraviolet source 14 is a conventional UV source, e.g., a deuterium or cadmium lamp. When powered by a second power supply 18, the ultraviolet source 14 provides a second beam of ultraviolet energy. In order to control potentially harmful radiation, the beam is controlled by a shutter 24. The shutter 24 is a conventional and commercially available, flag or leaf-aperture design. The shutter 24 is triggered by a conventional vehicle sensor 26. The vehicle sensor 26 is located in the road to trigger the shutter to permit transmission of the ultraviolet beam briefly and at the precise moment necessary to illuminate the exhaust of the vehicle. An imaging lens 28 focuses the UV beam 15 onto a second mirror 30. The second mirror 30 reflects the UV beam onto the first mirror 22.

The first mirror 22 and the second mirror 30 are cold mirrors constructed of sapphire or other suitable material. The surface of each mirror upon which the ultraviolet radiation is incident is coated with an optical thin film in a conventional manner to reflect energy in the 0.2–0.3 micron range and to transmit energy in the 0.4–5 micron range. The first mirror 22 provides a composite beam 31. The composite beam 31 is chopped by a mechanical chopper 34 to facilitate the detection thereof. The chopped beam 31 is collimated into an output beam by a conventional collimating mirror 36.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A source comprising:

first means for providing a first beam comprising infrared and visible energy;

second means for providing a second beam of ultraviolet energy; and third means for eliminating visible energy from said first beam and for directing said first and second beams to a common output aperture to provide an output beam, wherein said third means includes a first mirror for transmitting infrared and visible energy, a second mirror for directing ultraviolet energy to said first mirror, and a third mirror for collimating said output beam;

means for detecting the presence of an object;

means for enabling said second means on the detection of said object, wherein said means for enabling said second means on the detection of said object is a shutter which selectively blocks ultraviolet energy; and means for chopping the output beam.

* * * * *